(12) United States Patent
Hara

(10) Patent No.: US 7,995,869 B2
(45) Date of Patent: Aug. 9, 2011

(54) INFORMATION PROCESSING APPARATUS, INFORMATION PROCESSING METHOD, AND INFORMATION STORING MEDIUM

(75) Inventor: Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1128 days.

(21) Appl. No.: 11/790,838

(22) Filed: Apr. 27, 2007

(65) Prior Publication Data

US 2007/0258622 A1 Nov. 8, 2007

(30) Foreign Application Priority Data

May 2, 2006 (JP) ................... 2006-128556

(51) Int. Cl.
G06K 9/54 (2006.01)
G06K 9/00 (2006.01)

(52) U.S. Cl. ........................ 382/305; 382/100

(58) Field of Classification Search .................. 382/100, 382/176, 181, 190, 191, 124, 164, 173, 305; 358/3.28; 340/5.86; 380/54, 55; 705/14, 705/37, 80; 707/1, 3, 6, 10
See application file for complete search history.

(56) References Cited

U.S. PATENT DOCUMENTS

| | | | |
|---|---|---|---|
| 7,421,124 B2 * | 9/2008 | Kitora et al. | 382/181 |
| 7,536,026 B2 * | 5/2009 | Kaneda et al. | 382/100 |
| 2005/0264851 A1 | 12/2005 | Hara | |
| 2006/0147084 A1 | 7/2006 | Hara | |
| 2006/0164693 A1 | 7/2006 | Matsumoto et al. | |

FOREIGN PATENT DOCUMENTS

| | | |
|---|---|---|
| CN | 1450495 A | 10/2003 |
| JP | 05-233873 | 9/1993 |
| JP | 06-004704 | 1/1994 |
| JP | 07-037036 | 2/1995 |
| JP | 07-073271 | 3/1995 |
| JP | 2000-076286 | 3/2000 |
| JP | 2000-324331 | 11/2000 |
| JP | 2000-341498 | 12/2000 |
| JP | 2001-177712 | 6/2001 |
| JP | 2002-259249 | 9/2002 |
| JP | 2004-192390 | 7/2004 |
| JP | 2004-214991 | 7/2004 |
| JP | 2005-223574 | 8/2005 |
| JP | 2005-259249 | 9/2005 |
| JP | 2005-311942 | 11/2005 |
| JP | 2006-229874 | 8/2006 |

* cited by examiner

*Primary Examiner* — Yon Couso
(74) *Attorney, Agent, or Firm* — Dickstein Shapiro LLP

(57) ABSTRACT

An information processing apparatus configured to generate object information from image information, the information processing apparatus includes: an image reference information generation part configured to generate image reference information based on the image information; wherein the object information includes the image reference information.

20 Claims, 16 Drawing Sheets

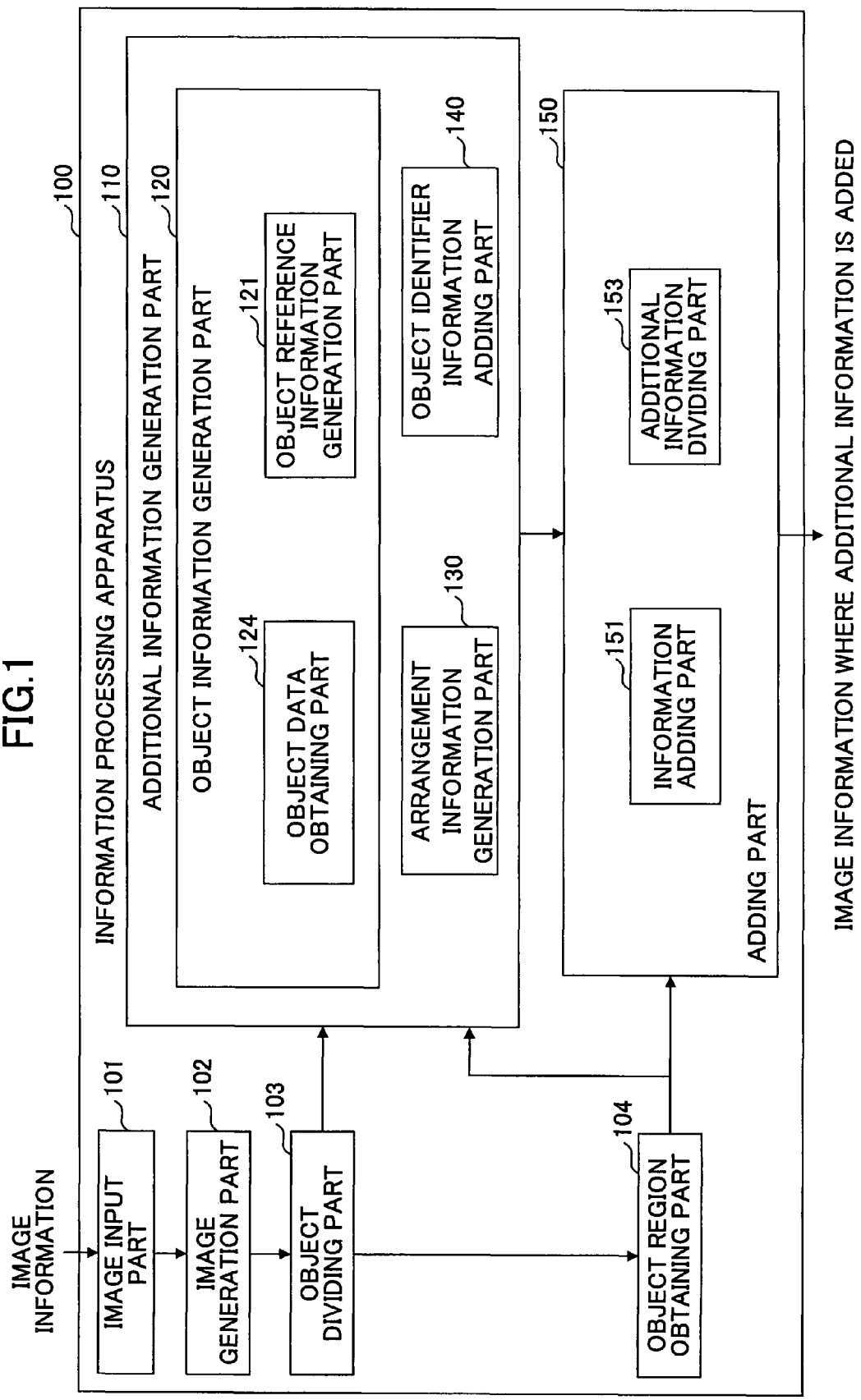

FIG.2

```
<!DOCTYPE HTML PUBLIC "-//W3C//DTD HTML 4.01 Transitional//EN">
<html lang="ja">
<head>
<meta http-equiv="Content-Type" content="text/html; charset=iso-2022-jp">
<title> $B3t<02q<R%j%3!< (B | Recoh Japan</title>
</head>
<body bgcolor="#FFFFFF" leftmargin="0" topmargin="0" marginwidth="0" marginheight="0" class="bgtop03">
<table border="0" width="748" cellpadding="0" cellspacing="0">         2c
<tr valign="top">
<td width="10" rowspan="2" nowrap><a href="#content" name="top"><img src="/common/img/space.gif" width="10" height="2"
alt="Jump to main content" border="0"></a><br></td>
<td width="117" rowspan="2" nowrap><img src="/common/img/space.gif" width="8" height="15" alt=""><br><a href="/"><img
src="/common/img/recoh.gif" width="109" height="30" alt="RECOH" border="0" hspace="4"></a><br><img
src="/common/img/space.gif" width="8" height="14" alt=""><br><img src="/common/img/global_navi_line2.gif" width="117" height="1"
alt=""><br></td>           2b
         2a
</tr>
</table>
</body>
</html>
```

FIG.3

OBJECT INFORMATION

| ID | KINDS | CONTENTS |
|---|---|---|
| 000 | CHARACTER REGION | IN THIS REPORT ... |
| 001 | PHOTO | IMAGE REFERENCE: RECTANGLE(12,28)–(45,53) |
| 002 | DIAGRAM | IMAGE REFERENCE: ID |
| ... | ... | ... |

FIG.4

ARRANGEMENT INFORMATION

| ID | ATTRIBUTE | VALUE |
|---|---|---|
| 000 | STARTING POINT | (10,20) |
| | SIZE | 10.5 |
| | STYLE OF WRITING | GOTHIC |
| 001 | STARTING POINT | (15,160) |
| | MAGNIFICATION | 100% |
| 002 | STARTING POINT | (240,320) |
| | MAGNIFICATION | 100% |
| ... | ... | ... |

INFORMATION PROCESSING APPARATUS, INFORMATION PROCESSING METHOD, AND INFORMATION STORING MEDIUM

BACKGROUND OF THE INVENTION

1. Field of the Invention

The present invention generally relates to information processing apparatuses, information processing methods, and information storing media.

2. Description of the Related Art

Conventionally and continuingly, there has been an apparatus or method where an image or image related information is embedded in a digital image as digital watermark information so that information or related information of the image embedded as the digital watermark information is obtained at the time when the image is read.

For example, Japanese Laid-Open Patent Application Publication No. 2002-259249 describes a method for accessing a home page having a step in which information equipment reads an image including a URL having an electronic watermark form, a step in which the information equipment transmits the image to a server, a step in which the server extracts a watermark from the image to acquire the URL, and a step in which the server transmits the URL to the information equipment.

According to this method, it is possible to access a home page associated with an image based on the image read by a camera.

Furthermore, for example, Japanese Laid-Open Patent Application Publication No. 2000-76286 describes an image communication system wherein a duplicate image generation program generates a duplicate image file from an original image file, and the ID of the duplicate image file is embedded as image in the duplicate image file. The relationship of the ID of the duplicate image file and the original image is registered in a correlating relationship table. When an image communication server program receives a request from an image communication client program, it extracts the ID of a duplicate image file from the request.

It refers to the correlating relationship table and specifies the original image having a correlated relationship with the ID of the duplicate image file. Information related to the original image file is generated based thereon and is transmitted to the image communication client.

In addition, for example, Japanese Laid-Open Patent Application Publication No. 2000-341498 describes a method for re-digitizing an analog document, wherein an input digital document is converted into printing image information and the digital document information is embedded in the printing image information as digital watermark information by electronic watermark technology.

In this method, the printing image information containing the embedded electronic watermark information is printed as an analog document and converted into a digital image and the digital document which is the embedded electronic watermark information is detected from the digital image and output.

Furthermore, Japanese Laid-Open Patent Application Publication No. 5-233873, Japanese Laid-Open Patent Application Publication No. 6-4704, Japanese Laid-Open Patent Application Publication No. 7-37036, and Japanese Laid-Open Patent Application Publication No. 7-73271 describe related techniques.

However, in the techniques described in Japanese Laid-Open Patent Application Publication No. 2002-259249 and Japanese Laid-Open Patent Application Publication No. 2000-76286, when the information is obtained based on the watermark information obtained by the client or the like, access to the URL or request to the server is made. Therefore, means for connecting to an external device such as a network interface is necessary for the client. It is not discussed in Japanese Laid-Open Patent Application Publication No. 2002-259249 and Japanese Laid-Open Patent Application Publication No. 2000-76286 that such connection means does not exist. In addition, even if such a connection exists, if the communications status is not good, information cannot be obtained.

Furthermore, in the technique described in Japanese Laid-Open Patent Application Publication No. 2002-259249, since the server extracts the digital watermark information, if communication is impossible or difficult, the URL information that is an address of an object of communication cannot be obtained.

In addition, in the techniques described in Japanese Laid-Open Patent Application Publication No. 2002-259249 and Japanese Laid-Open Patent Application Publication No. 2000-76286, even if the client or the like is connected to the external device and the communication status is good, in a case where the information obtained from the server or the like is image data or the like, the amount of the information is large so that communication time or cost for communications is large. However, this is not considered in the techniques described in Japanese Laid-Open Patent Application Publication No. 2002-259249 and Japanese Laid-Open Patent Application Publication No. 2000-76286.

On the other hand, in Japanese Laid-Open Patent Application Publication No. 2000-341498, since the digital information corresponding to the analog document is stored in the analog document as the digital watermark information, there is no need to provide the communication means including the network interface as described in Japanese Laid-Open Patent Application Publication No. 2002-259249 and Japanese Laid-Open Patent Application Publication No. 2000-76286. Therefore, there is no need to consider the communication cost for obtaining the information.

However, in Japanese Laid-Open Patent Application Publication No. 2000-341498, the amount of information to be embedded as the digital watermark information is not considered. For example, in a case where the information to be embedded as the digital watermark information is relatively small, this may not be a problem. However, in a case where a large amount of data is embedded, degradation of quality of the embedded image of the analog document becomes large or an amount of the data that can be embedded becomes larger than the amount of the image data to be embedded.

Here, the small amount of data is, for example, text data, small image data, data of a small image and having a small number of colors, or the like. The large amount of data is, for example, full color image data or data of an image having a large angle of view, or the like.

In addition, as a method for adding the information to the analog document, there is a method wherein the information is converted into a designated image code or the like so as to be added in addition to embedding as the digital watermark information. Even if the image code or the like is used, the amount of the data to be added is limited. Therefore, it is difficult to add a large amount of data such as the date of the image to the document as the additional information.

SUMMARY OF THE INVENTION

Accordingly, embodiments of the present invention may provide a novel and useful information processing apparatus, information processing method, and information storing medium, solving one or more of the problems discussed above.

More specifically, the embodiments of the present invention provide an information processing apparatus, an information processing method, and an information storing medium whereby information of an object of image information can be generated with a small amount of data.

According to the above-mentioned information processing apparatus, information processing method, and information storing medium, it is possible to generate the information of the object of the image information with a small amount of data.

One aspect of the present invention may be to provide an information processing apparatus configured to generate object information from image information, the information processing apparatus including: an image reference information generation part configured to generate image reference information based on the image information; wherein the object information includes the image reference information.

Another aspect of the present invention may be to provide an information processing apparatus configured to add additional information with respect to an object to image information, the information processing apparatus including: an image reference information generation part configured to generate image reference information based on the image information; an object information generation part configured to generate object information having the image reference information generated by the image reference information generation part; and an information adding part configured to add the object information generated by the object information generation part to the image information as additional information.

Other aspect of the present invention may be to provide an information processing method whereby additional information with respect to an object is added to image information, the information processing method including: an image reference information generation step of generating image reference information based on the image information; an object information generation step of generating object information having the image reference information generated by the image reference information generation step; and an information adding step of adding the object information generated by the object information generation step to the image information as additional information.

Other aspect of the present invention may be to provide an information storing medium, which information storing medium can be read by a computer where an information processing program for making the computer implement an information processing method is stored, the information processing method including: an image reference information generation step of generating image reference information based on the image information; an object information generation step of generating object information having the image reference information generated by the image reference information generation step; and an information adding step of adding the object information generated by the object information generation step to the image information as additional information.

Other objects, features, and advantages of the present invention will be come more apparent from the following detailed description when read in conjunction with the accompanying drawings.

BRIEF DESCRIPTION OF THE DRAWINGS

FIG. 1 is a block diagram showing a functional structure of an information processing apparatus of an embodiment of the present invention;

FIG. 2 shows an example of image information described by HTML;

FIG. 3 is a table showing object information;

FIG. 4 is a table showing arrangement information;

DETAILED DESCRIPTION OF THE PREFERRED EMBODIMENTS

Figure 5:
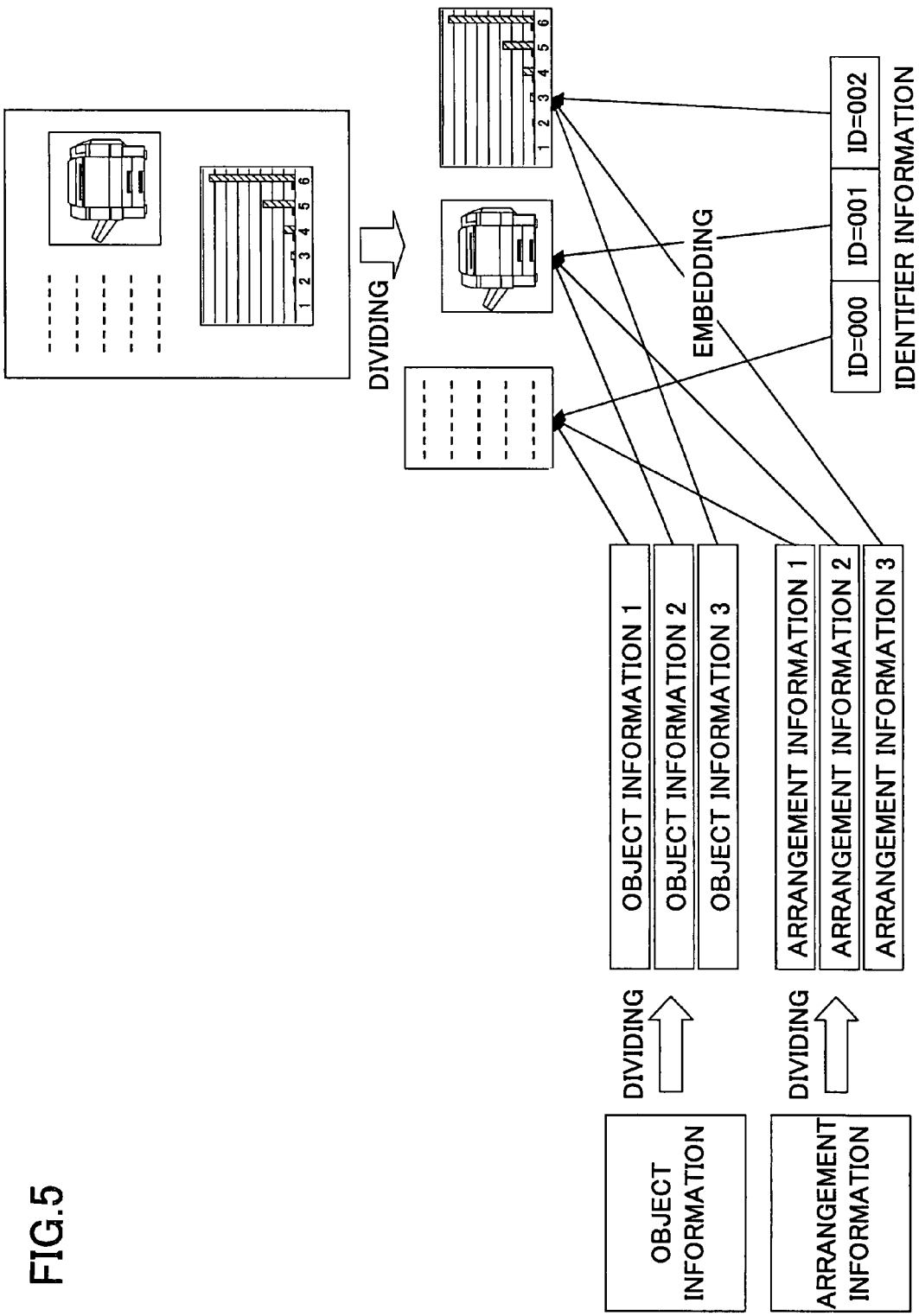
FIG. 5 is a schematic view showing an example where additional information is divided and added to an image.

A description is given below, with reference to the FIG. 1 through FIG. 16 of embodiments of the present invention.

First Embodiment of the Present Invention (Functional Structure of an Information Processing Apparatus of the First Embodiment of the Present Invention)

FIG. 1 is a block diagram showing a functional structure of an information processing apparatus of an embodiment of the present invention.

As shown in FIG. 1, image information is input to an image processing apparatus 100 so that a process is implemented and image information where additional information is added is output.

Object information or arrangement information is included in the additional information. The object information is information about an object. The object is a character or an image containing the image information.

The arrangement information is information for arranging the object. The arrangement information includes, for example, information with respect to a size, an enlargement ratio, a reduction ratio, or font for every object.

In addition, object identifier information for identifying the object may be included in the additional information. The object identifier information is a number or a mark included in the object information or the arrangement information. The object identifier information may be used for correlating the object information and the arrangement information.

Information for representing the image information as vector data can be added to the image information as the additional information by the information processing apparatus 100.

The information processing apparatus 100 includes an additional information generation part 110, an adding part 150, an image input part 101, an image generation part 102, an object dividing part 103, and an object region obtaining part 104.

The additional information generation part 110 generates information with respect to the object of the image information. The additional information generation part 110 includes an object information generation part 120, an arrangement information generation part 130, and an object identifier information adding part 140.

The object information generation part 120 generates information of the object of the image information. The object information generation part 120 includes an object reference information generation part 121 and an object data obtaining part 124.

As discussed below, the object information is information having designated attributes and contents for every object of the image information and may be composed of vector data.

The object reference information generation part 121 designates a region of the image information by a designated method and refers to the region so that the object information is generated.

A subject of image reference information generated by the object reference information generation part 121 is an object, such as a photo or graph, having a large amount of data such as full color or having a large angle of view.

Because of this, it is possible to generate object information using image reference information having a small amount of data compared to the photo or the like having a larger amount of data than the small image data or text data.

The object reference information generation part 121 also may generate image reference information whereby the region on the image information is referred to by coordinates. In a case where the image information is input as an image to the image processing apparatus 100, the image is processed by a designated method so that the coordinates of the region such as the photo of the image information are obtained.

In addition, in a case where the image information is input as vector data, the region of the object of the image information may be obtained by processing position information included in the vector data.

Furthermore, in a case where the image information is input as information described by a data description language, the region of the object of the photo or the like of the image information may be obtained by a part of metadata of the object.

The object reference information generation part 121 also may generate image reference information referred to by object identifier information. The object identifier information is identifier information given for every object in the image information and is, for example, a number or a mark given uniquely.

The object data obtaining part 124 obtains a main body of data for an object whose data amount is small such as text and generates the object information having the data. In a case where, for example, the object is a document, text data are obtained as the main body of the data.

The arrangement information generation part 130 generates arrangement information for arranging the object of the image information. By generating the arrangement information, it is possible to arrange for the image information to be composed of the object information. Details of the arrangement information are discussed below.

The object identifier giving part 140 uniquely generates the identifier information in the image information for the object of the image information so as to give the identifier information to the object.

The identifier information given by the object identifier information giving part 140 is used not only in the image reference information generated by the object reference information generation part 121 but also at the time when the object information and the arrangement information are correlated to each other. Details of this are discussed below.

It is not always necessary to provide the arrangement information generation part 130 and the object identifier information giving part 140 at the additional information generation part 110. Depending on required function, the additional information generation part 110 may have the arrangement information generation part 130 and the object identifier information giving part 140.

The adding part 150 adds the object information and the arrangement information generated by the additional information generation part 110 to the image of the image information. The adding part 150 includes an information adding part 151 and an additional information dividing part 153.

The information adding part 151 adds the additional information to the image of the image information by a designated method. The additional information to be added is either the object information or the arrangement information or both the object information and the arrangement information. For example, the addition information can be added to the image information as digital watermark information or as visible information such as a dot code or a QR code.

The information adding part 151 may also add the object identifier information given for every object by the object identifier information giving part 140, in the region of each of the objects of the image information. The region of the object is obtained by the object region obtaining part 104 discussed below.

Because of this, it is possible to generate the image information where the object identifier information corresponding to the object is added for every object.

The adding information dividing part 153 divides the additional information generated by the additional information generation part 110. The divided additional information is added by the information adding part 151 for every region of the object.

The adding information dividing part 153, for example, equally divides the addition information. The adding information dividing part 153 may also divide the object information or the arrangement information for every unit of the object to which the object information or the arrangement information corresponds.

The adding information dividing part 153 may divide the additional information as corresponding to the region of the object where the divided additional information is added. For example, the additional information is divided into the amount corresponding to plural adding methods in a case where the adding methods are different from each other, corresponding to kinds of regions of the object to be added.

Because of this, for example, the amount of the additional information can be properly divided for a case where the additional information is added to the text data and for a case where the additional information is added to the image data.

In a case where the sizes of the regions of the object to be added are different, the addition information dividing part 153 may divide the additional information depending on the sizes of the regions of the object.

Because of this, the amount of the additional information can be properly divided in the image information corresponding to the sizes of the regions of the object.

In a case where the addition information or divided additional information is added plural times in the regions of the object or the image information so that the image information where the additional information is added is changed by editing, the information adding part 151 may add so that an error generated in the added additional information is detected or corrected.

It is not always necessary for the addition information dividing part 153 to be provided at the adding part 150. Only if necessary, the additional information dividing part 153 may be provided at the adding part 150.

The adding part 150 may be a control part of an apparatus having an output part such as an MFP (multiple function processing machine). The adding part 150 may also be a device driver such as a printer driver operated on an OS (operating system) of a PC (personal computer). The adding part 150 may be an application generating raster data or vector data.

The image input part 101 obtains the image information. The image information may be an image formed on a medium such as paper, an image generated by the application, an image obtained as a digital image, or an image generated by other means.

The image information may also have a data format or raster data or vector data. The image information may be composed by using a data description language or a format used by a designated application.

The image generation part 102 composes the image data as raster data in a case where the image information input to the image input part 101 is not in the format of raster data.

The object dividing part 103 extracts the object from the image information. The object dividing part 103 does region-dividing of the image generated by the image generation part 102 and the image of the image information composed of the raster data is input to the image input part by a designated method so that the object is generated.

In a case where the image information being input to the image input part is not composed of the raster data, the object dividing part 103 may generate the object by analyzing the position or attribute information or designated metadata of the data description language.

The object region obtaining part 104 obtains the region of the object generated by the object dividing part 103 as the position information of the coordinates. The object dividing part 103 and the object region obtaining part 104 may be combined.

The functions of the information processing apparatus 100 may not be realized as shown in FIG. 1. Each part may be provided so that the functions of the information processing apparatus 100 are realized.

(Example of Obtaining Regions of Object)

FIG. 2 shows an example of image information written in HTML.

Referring to FIG. 2, since an object 2a is included in an "img" tag, it is found that the object 2a is a photo, diagram, or the like. Since the extension of the file name or path name of a storing location is "gif", it is found that the object 2a is an image file having a gif format. It is also found that a region of the object 2a has a size of width 109 and height 30 from "width" and "height" of an underlined 2b of the "img" tag.

The object 2a is also arranged at a column of a 1st line and a second row included in a table format defined by a "table" tag (underline 2c) and the table has width 748. Because of this, the object dividing part 103 may obtain the object having the "image" tag as an object of an image or the like. The object region obtaining part 104 may obtain the region of the object based on a structure of a table including the argument of "img" tag and the "img" tag.

In a case where the image information being input is not raster data, the object dividing part 103 and the object region obtaining part 104 implement a process for analyzing the image of the image information generated by the image generation part 102, so that the image at an apparatus for extracting the additional information added by the adding part 150 can be divided for the object, or the region of the object of the image can be obtained with the same algorithm as that of the information processing apparatus 100.

As a result of this, when the addition information is extracted, it is possible to divide the object with high precision and obtain the regions of the object.

There are several techniques for dividing the image information composed of raster data for the object or obtaining the object regions from the image information.

For example, in the technique discussed in Japanese Laid-Open Patent Application Publication No. 5-233873, the circumscribed rectangle of a black link component is extracted by a rectangle extraction part, the histogram of the height of the rectangle is generated by a histogram generation part and based on this histogram, the standard character size is decided by a standard character size decision part. A rectangle classification part classifies the character rectangle and the chart rectangle by comparing the standard character size with the size of the rectangles. A line extraction part extracts a line merging the character rectangles and a character area generation part extracts the character area merging those lines. As a result of this, it is possible to exactly execute area division for various documents in different character sizes.

Furthermore, in the technique discussed in Japanese Laid-Open Patent Application Publication No. 6-4704, circumscribed rectangles of black linking components are extracted from an input document picture by a rectangle extracting part. A size W in the horizontal direction and a size H in the vertical direction of each of these extracted rectangles are compared with respective thresholds RLHTB and RLVTH by a rectangle classifying part to discriminate the rectangles satisfying conditions W>RLHTH and H>RLVTH as horizontal ruled line rectangle candidates. Pictures in ranges of these discriminated rectangles are scanned in the horizontal direction to extract black runs longer than a threshold by a horizontal ruled line extracting part, and rectangles circumscribed to linking components of these black runs are extracted as ruled line rectangles. The rectangles satisfying a prescribed condition out of these rectangles are finally discriminated as a horizontal ruled line by a horizontal ruled line approving part. As a result of this, it is possible to exactly discriminate and extract a horizontal or vertical ruled line by going through stages of selection of ruled line rectangle candidates, extraction of a ruled line rectangle from ruled line rectangle candidates, and condition discrimination of the ruled line rectangle.

In addition, in the technique discussed in Japanese Laid-Open Patent Application Publication No. 7-37036, an area identifying part includes an image compressing part, a circumscribed rectangle detecting part, a rectangle sorting part, and a character area integrating part. The part extracts a rectangle circumscribing a black picture element coupling component out of the document image data compressed in an image memory. The extracted rectangles include the rectangles of attributes like the ruled lines, tables, diagrams, graphs, etc., in addition to a rectangle of characters (a character string of a character or two characters or more). The part sorts the attributes of such rectangles based on the shape information and the internal data on the rectangles. The part integrates the character rectangle with other sorted rectangles to generate a character area. Then, the identifying result of the part is utilized by a character recognizing part for recognition of characters. As a result of this, it is possible to sort the attributes of areas of a circumscribed rectangle of a black picture element coupling component with higher accuracy by using the information on the number of horizontal and vertical pseudo ruled lines and the relative positions of these lines for the sorting of attributes in addition to the exterior features of the rectangle area.

Furthermore, in the technique discussed in Japanese Laid-Open Patent Application Publication No. 7-73271, a circumscribed rectangle detecting part detects a circumscribed rectangle of the black picture element coupling component of an image obtained by applying the OR compression to an input document image through an image compressing part. A rectangle sorting part sorts the rectangles into the character rectangles and other rectangles. A character area integrating part automatically sets the threshold value for integration of characters based on the vertical/horizontal ratio of the character rectangle or a space distribution and integrates the lines of the character rectangle. However the integration of the text lines and the footers or headers is prevented between the character rectangles. Furthermore the threshold value is increased by punctuation marks so that the failure of integration of punctuation marks can be prevented. Then the character rectangles of footers and headers are integrated with the character area different from the text area. As a result of this, it is possible to automatically set the threshold value for integration of a character rectangle and also to separate the text area from the footers, the headers, etc., when a document area is divided.

(Example of Object Information)

FIG. 3 is a table showing object information generated by the addition information generation part 110.

Object information of an object of a photo or text is shown in FIG. 3. From a left part of the table, identifier information, kinds, and contents are shown.

An object of identifier information "000" is "CHARACTER REGION" whose contents include text data starting from "IN THIS REPORT . . . ".

An object of identifier information "001" is "PHOTO" whose contents include characters of "IMAGE REFERENCE" indicating referring to the image information with a designated method, "RECTANGLE" that is a configuration of the object, and coordinates "(12, 28)-(45, 53)" of a starting point and an end point of the rectangle.

Under the object of the identifier information "001", object information of another object follows.

Contents of the object of the identifier information "001" are image reference information by the coordinates among the image reference information. The image reference information by the coordinates may be circular, polygonal, or another configuration. A designated coordinate line corresponding to each of the configurations may be described.

The object of the identifier information "002" is "DIAGRAM" whose contents include the identifier information (ID) following characters of the "IMAGE REFERENCE". Contents of the object of the identifier information "002" are image reference information by the identifier information among the imager reference information.

(Example of Arrangement Information)

FIG. 4 is a table showing arrangement information generated by the arrangement information generation part 130. In FIG. 4, the arrangement information corresponding to each of the object region is shown and from a left part of the table, identifier information, attribute, and values are shown. The object information corresponding to the arrangement information is correlated by the identifier information of each of the arrangement information items.

The object region of the identifier information "000" corresponds to the object information of the character region in FIG. 3. Therefore, the attribute includes a starting point of the character region, the size of the character (point number of the font), and the style of writing of the font. Corresponding to each of them, "(10, 20)" that is information of the coordinate point, "10.5" that is the point number of the font, and "gothic" that is information of the style of writing are held as values.

The object of the identifier information "001" corresponds to the object information of the photo in FIG. 3. Therefore, the attribute includes a starting point of the photo and a magnification of the photo. Corresponding to each of them, "(15, 160)" that is information of the coordinate point and "100%" that is the magnification are held as values.

The object of the identifier information "002" corresponds to the object information of the diagram in FIG. 3. Therefore, the attribute includes a starting point of the diagram and a magnification of the diagram. Corresponding to each of them, "(240, 320)" that is information of the coordinate point and "100%" that is the magnification are held as values.

In the information processing apparatus of the embodiment of the present invention, the attribute of the values of each of the arrangement information items shown in FIG. 4 is not limited to the above-discussed example. The value and the attribute for defining the arrangement may be for various objects.

In addition, it is not necessary that the identifier information are correlating the object information and the arrangement information to each other and the identifier information set used for referring to the object be the same identifier information set. Each of the identifier information sets may be provided for the object in the image information.

In FIG. 3 and FIG. 4, identifiers of "character region", "photo", "diagram", "rectangle", and "image reference" may be defined so that each of operations and contents is uniquely defined. Other identifiers indicating the kinds or configurations of the object may be used.

In addition, while the data structure of the object information is discussed in the examples shown in FIG. 3 and FIG. 4, the object information may be described by a data description language or designated binary format, for example.

Furthermore, the object information and the arrangement information are shown so as to have different data structure in the examples shown in FIG. 3 and FIG. 4, but the object information and the arrangement information generated by the information processing apparatus of the embodiment of the present invention may not have independent data structures. The object information and the arrangement information may be included in a single data structure.

(Example for Dividing Additional Information)

FIG. 5 is a schematic view showing an example where the object information and the arrangement information that are additional information are divided and added to an image of the image information.

Referring to FIG. 5, the object information is divided by the additional information dividing part 153 so that the object information 1 through the object information 3 are generated. In addition, the arrangement information is divided by the additional information dividing part 153 so that the arrangement information 1 through the arrangement information 3 are generated.

The object information 1 through the object information 3 are the arrangement information 1 through the arrangement information 3 may not correspond to each other for every divided information item number.

On the other hand, the image information of a process subject document is divided into the objects by the object dividing part 103 so that the objects of the character region, the photo, and the diagram are generated.

In addition, these regions are obtained by the object region obtaining part 104 with the position information.

The information adding part 151 adds the object identifier information that is identifier information given for every object by the object identifier information giving part 140 in the regions of the corresponding object. In addition, the information adding part 151 adds the object information and the arrangement information that are the additional information divided by the additional information dividing part 153 for every region of the object.

Because of this, it is possible to provide the information processing apparatus whereby the object can be identified in a case where the object identifier information of the object is obtained from the regions of the object. In addition, it is possible to provide the information processing apparatus whereby the additional information can be efficiently added by dividing the additional information corresponding to the characteristic of the regions of the object.

(Flow of Process from Generation of Object to Adding of the Additional Information)

Figure 6:
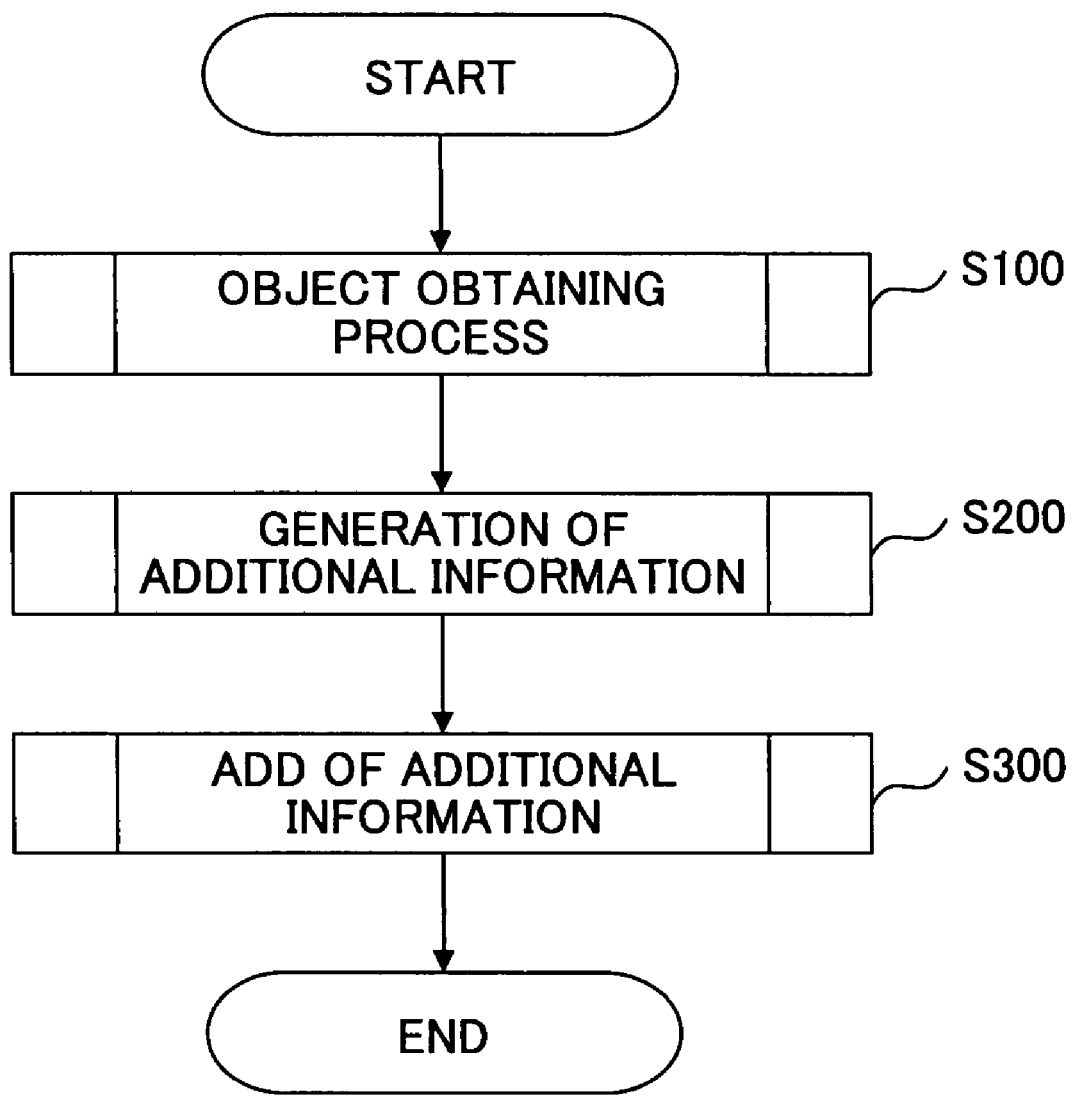
FIG. 6 is a flowchart showing a flow of a process of generation and adding of the additional information in an information processing method of the embodiment of the present invention.

FIG. 6 is a flowchart showing a flow of a process of generation and adding of the additional information in an information processing method of the embodiment of the present invention.

Referring to FIG. 6, in step S100, the object dividing part 103 or the like obtains the object from the image information so as to obtain the regions of the object. In step S200, the additional information generation part 110 generates the additional information of the object of the image information. In step S300, the additional information 150 adds the additional information obtained in step S200 to the image information.

Figure 7:
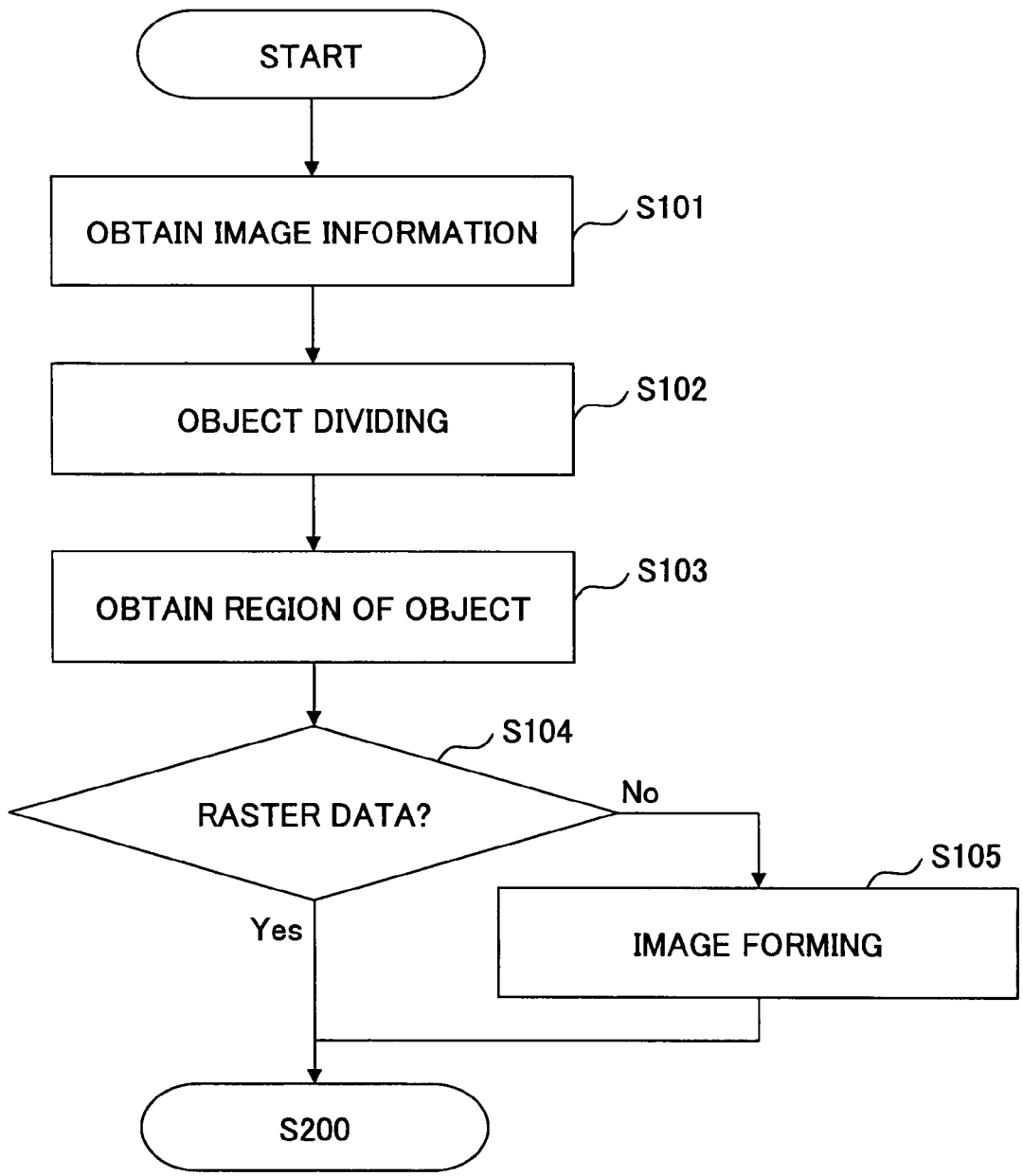
FIG. 7 is a flowchart showing a flow of a process for obtaining an object of input image information.

FIG. 7 is a flowchart showing a flow of a process for obtaining the object of the input image information.

The input image information is processed so as to be divided for the object and thereby the regions of the object are obtained.

In step S101, the image input part 101 obtains image information of an image being input. The image being input may be, for example, an image read by a scanner, an image formed by an application, an image obtained as a digital image or an image formed by other means.

The image information may also have a data format or be raster data or vector data. The image information may be composed using a data description language or a format used by a designated application.

In step S102, the object dividing part 103 obtains the object of the image information. The object dividing part 103 obtains the object, based on, for example, application of a region dividing method to image information composed of raster data. The object dividing part 103 may also obtain the object based on analysis of the image information composed of vector data.

In step S103, the object region obtaining part 104 obtains the regions of the object divided by the object dividing part 103. Obtaining the object in step S102 and obtaining the regions of the object in step S103 may be implemented by a single step or single means.

In step S104, whether the input image data are composed of raster data is determined. If it is determined that the input image data are composed of raster data, the process goes to step S200. If it is determined that the input image data are not composed of raster data, the process goes to step S105. In step S105, the image generation part 102 generates the raster data that comprises the image of the image information from the input image information.

Step S104 and step S105 may be implemented prior to step S102 and step S103. Because of this, since a process of object dividing is implemented for the image information being input as the vector data after conversion to the raster data, the same algorithm as the process of object dividing implemented when the additional information is extracted from the image information can be applied.

It is not always necessary to implement the process of generation of the raster data in step S105. For example, in a case where the additional information is added to the image information composed of the vector data, the process for generating the raster data in step S105 may not be necessary.

Figure 8:
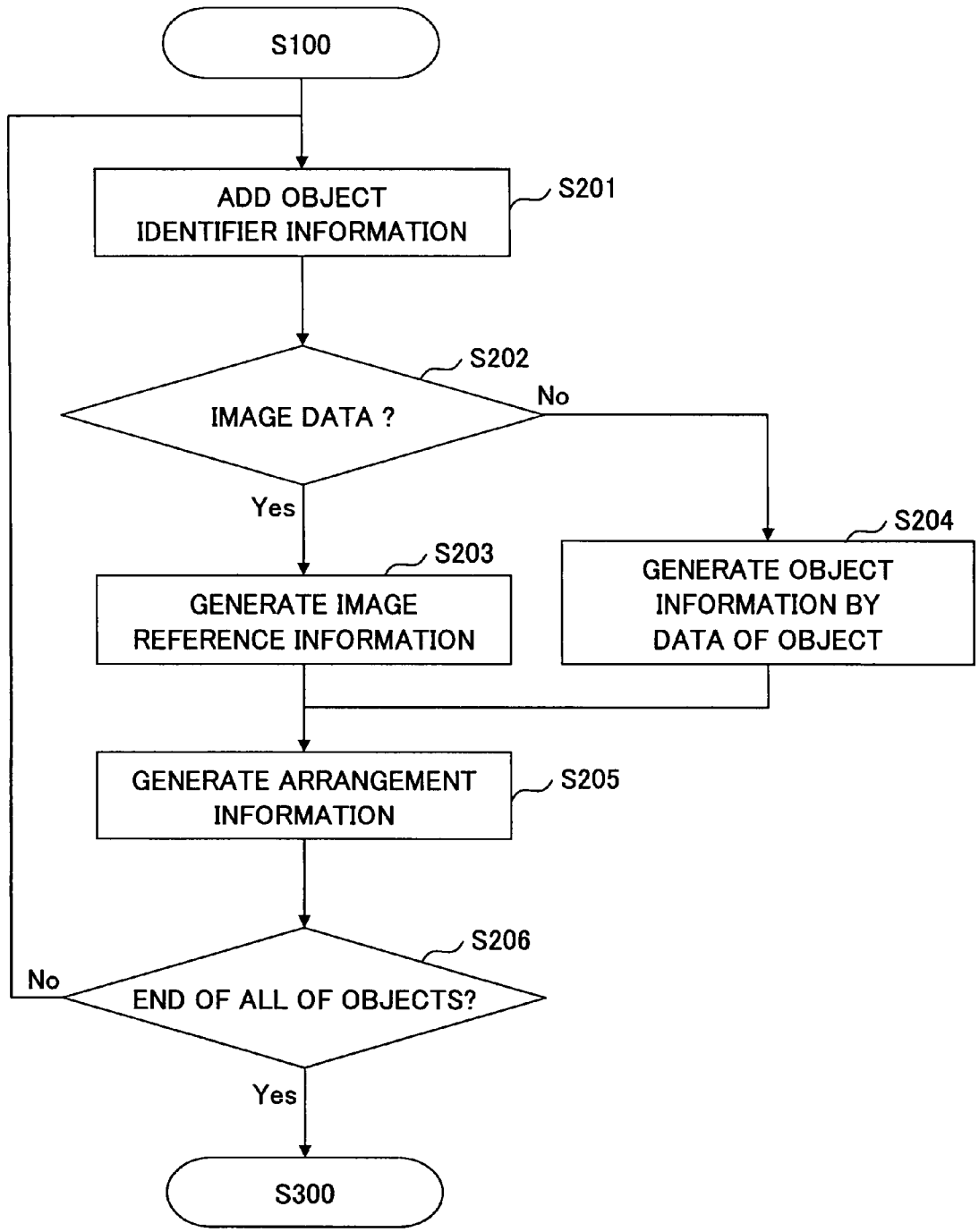
FIG. 8 is a flowchart showing a flow of a process for generating the additional information of the object of the image information.

FIG. 8 is a flowchart showing a flow of a process for generating the additional information of the object of the image information.

Referring to FIG. 8, in step S201, the object identifier information giving part 140 gives the object identifier information to the object generated in step S100. The object identifier information may be given so as to be unique for the object.

In step S202, whether the object to be processed is an object composed of an image is determined. In a case where it is determined that the object to be processed is an object composed of the image, the process goes to step S203. In a case where it is determined that the object to be processed is not an object composed of the image, the process goes to step S204.

The determination in step S202 may be made by whether the data amount of a main body of the data of the object is greater than the designated amount. The data amount of the additional information can be proper by defining the above-mentioned designated amount based on the amount of data that can be added as the additional information.

In step S203, the image reference information generation part 121 generates the object information of the image reference information. In step S204, the object data obtaining part 124 obtains the main body of the data of the object, for example the text data in a case where the object is composed of a document.

In step S205, the arrangement information generation part 121 generates the arrangement information indicating the position for arranging the object based on the regions of the object obtained in step S103.

By defining the arrangement information based on the input image information, it is possible to generate the substantially same image information as the input image information in a case where the arrangement information is used.

In step S206, it is determined whether processes from step S202 through S205 that are processes for generating the additional information are implemented for all objects of the image information.

In a case where there is an object that is not processed, the process goes to step S201. In a case where all of the objects are processed, the process goes to step S300.

Figure 9:
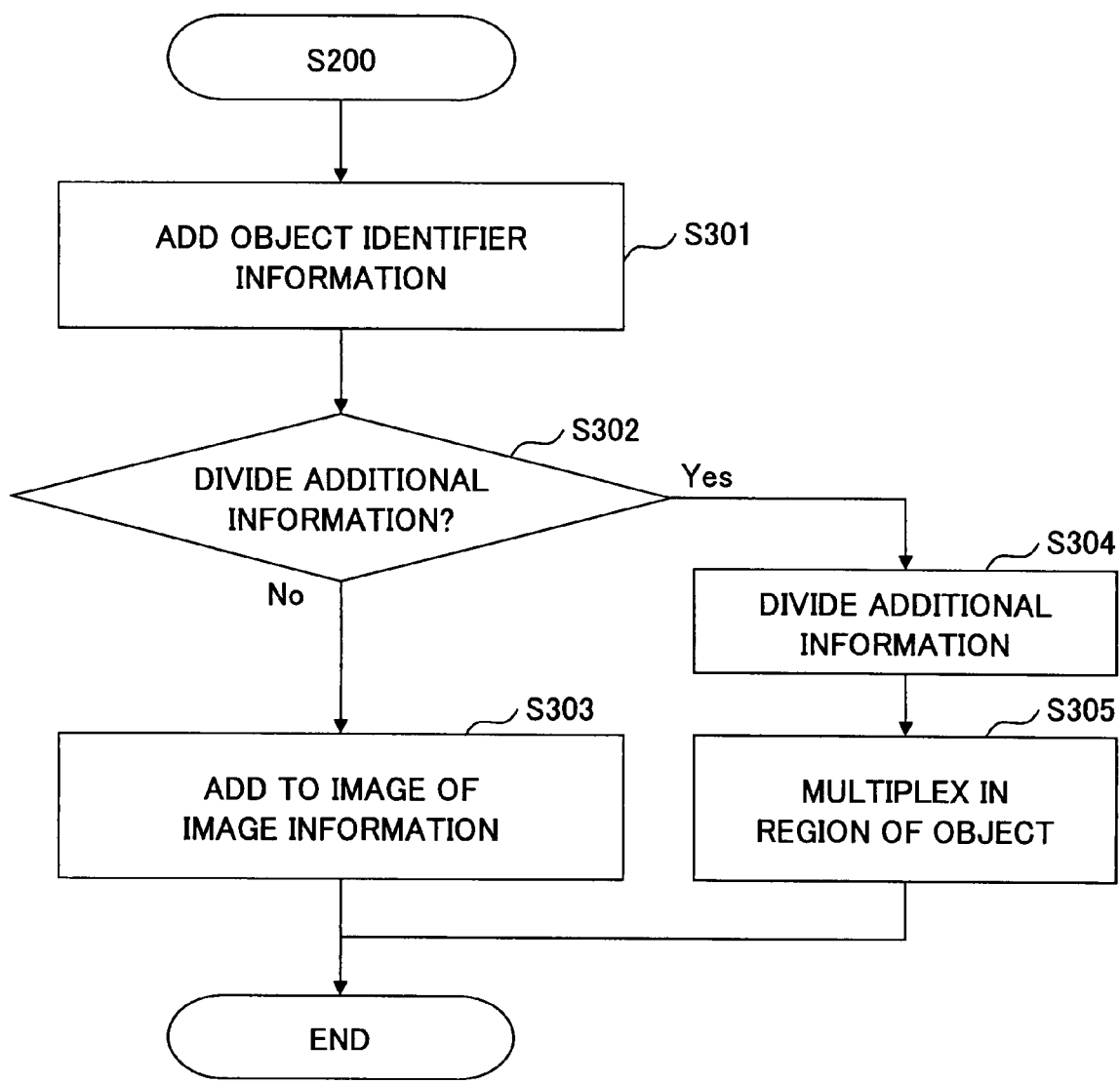
FIG. 9 is a flowchart showing a flow of a process for adding the additional information to the image information.

FIG. 9 is a flowchart showing a flow of a process for adding the additional information to the image information.

Referring to FIG. 9, in step S301, the information adding part 151 adds the identifier information of the object given for every object to the image information.

In step S302, whether the additional information is to be divided is determined. If the additional information is not to be divided, the process goes to step S303. If the additional information is to be divided the process goes to step S304.

In step S303, the information adding part 151 adds the object information or the arrangement information to the image information by a designated method.

On the other hand, in step S304, the additional information dividing part 153 divides the additional information.

In step S305, the information adding part 151 adds the additional information divided in step S304 to the regions of the object.

The image information where the additional information is added in step S301, step S303, and step S305 may be composed of an image or by using a designated description language. Because of this, the additional information can be added to the image information composed of raster data, the image information composed using a printer language, or the image information having another format.

When the process in step S303 or the process in step S305 is ended, all of the processes are ended.

(Functional Structure Diagram of Information Processing Apparatus for Extracting the Additional Information from the Image Information where the Additional Information is Added)

Figure 10:
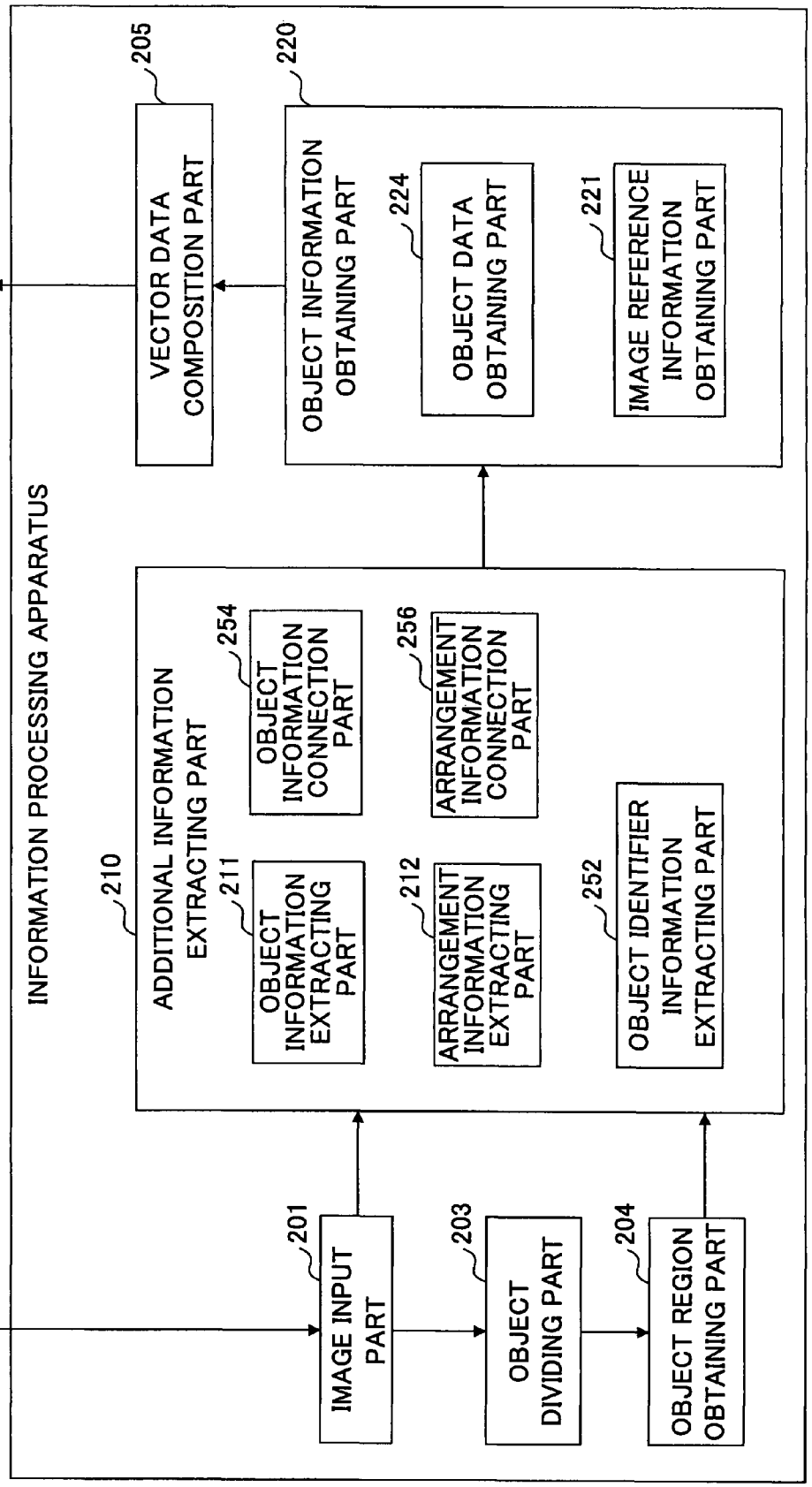
FIG. 10 is a block diagram showing a functional structure of an information processing apparatus wherein the image information is composed of vector data.

FIG. 10 is a block diagram showing a functional structure of an information processing apparatus for extracting the additional information from the image information where the additional information is added by the information processing apparatus 100 discussed above and for composing the image information with vector data.

Referring to FIG. 10, an information processing apparatus 200 obtains the image information where the additional information is added and processes the image information so that the image information composed of vector data is generated. By the information processing apparatus 200, the additional information is extracted from the image information and the image information can be composed of the vector data from the object information, the arrangement information or the object identifier information included in the additional information.

The information processing apparatus 200 includes an additional information extracting part 210, an object information obtaining part 220, an image input part 201, an object dividing part 203, an object region obtaining part 204, and a vector data composition part 205.

The information processing apparatus 200 may be composed of the information processing apparatus 100 as a single processing apparatus. In this case, same parts between the information processing apparatus 100 and the information processing apparatus 200 are not required to be repeatedly provided.

The additional information extracting part 210 obtains the additional information by extracting the additional information from the image information. The additional information extracting part 210 includes an object information extracting part 211, the arrangement information extracting part 212, the object identifier extracting part 252, the object information connection part 254, and the arrangement information connection part 256.

It is not necessary to provide all of the above-mentioned parts of the additional information extracting part 210. Depending on functions necessary for the information processing apparatus 200, the additional information extracting part 210 may have the parts.

The object information extracting part 211 obtains the object information by extracting the object information from the image. The arrangement information extracting part 212 obtains the arrangement information by extracting the arrangement information from the image. The object information extracting part 211 and the arrangement information extracting part 212 may be a single device The object identifier information extracting part 252 obtains the object identifier information given for every object by extracting the object identifier information from the regions of the object.

Obtained object identifier information is used for the image reference information extracting part 221 or the like. In a case where the object identifier information is uniquely given to the object in the image information, the object can be identified.

In a case where the object information of a single object or plural objects is divided and added for every region of the object, the object information extracting part 211 may obtain the divided object information by extracting the divided object information.

In a case where the divided object information is extracted, the object information connection part 254 connects the divided object information items to each other so as to obtain the object information. The object connection part 254 may be formed with the object information extracting part 211 as a single device.

In a case where the arrangement information of a single object or plural objects is divided and added for every region of the object, the arrangement information extracting part 212 may obtain the divided arrangement information by extracting the divided arrangement information.

In a case where the divided arrangement information is extracted, the arrangement information connection part 256 connects the divided arrangement information so as to obtain the arrangement information.

The arrangement information connection part 256 may be combined with the arrangement information extracting part 212 as a single device.

The object information obtaining part 220 obtains the data of the object based on the object information that is information of the object. The object information obtaining part 220 includes an image reference information obtaining part 221 and an object data obtaining part 224.

In a case of the object information where the coordinates of the image in the image information or the identifier information of the object of the image information is referred to, the image reference information obtaining part 221 obtains the data of the object having the data of the coordinates to be referred to or the identifier information to be referred to.

In a case where the object information includes the image reference information by the coordinates, the image reference information obtaining part 221 obtains the coordinates referring to the image of the input image information and the data of the image in the coordinates.

In a case where the object information includes the image reference information by the object identifier information, the image reference information obtaining part 221 obtains the object identifier information given to the object in the input image information and obtains the image data of the object from the region of the object where the object identifier information is added.

The object data obtaining part 224 obtains the data of the object included in the object information. The data obtained by the object data obtaining part 224 is, for example, text data of a document.

The image input part 201 obtains the image information where the additional information is added. The input image is typically an image composed of raster data. The image input part 201 may obtain the image by reading the image formed on the medium such as a paper by a scanner or the like.

The image input part 201 may obtain the image information that is data of the image stored in the storage medium, data of the image generated by the application or the like, or data of the image obtained via the external interface not shown of the information processing apparatus, where the additional information is added.

The object dividing part 203 divides the image information that is input by the image input part 201 to the object. A method for dividing the image information to be input to the object may be the same as the process implemented by the object dividing part 103 of the information processing apparatus 100.

The object region obtaining part 204 obtains the regions of the object of the image information. A method where the object region obtaining part 204 obtains the regions of the object may be the same as the process implemented by the object region obtaining part 104 of the information processing apparatus 100.

The vector data structure part 205 generates the image information composed of vector data by using the data of the object obtained by the object information obtaining part 220 and the arrangement information extracted by the arrangement information extracting part 212.

(Flow of a Process from Generation of Object to Adding the Additional Information)

FIG. 11 through FIG. 14 are flowcharts showing a flow of a process for extracting the additional information from the image information where the additional information is added so that the vector data are generated.

Figure 11:
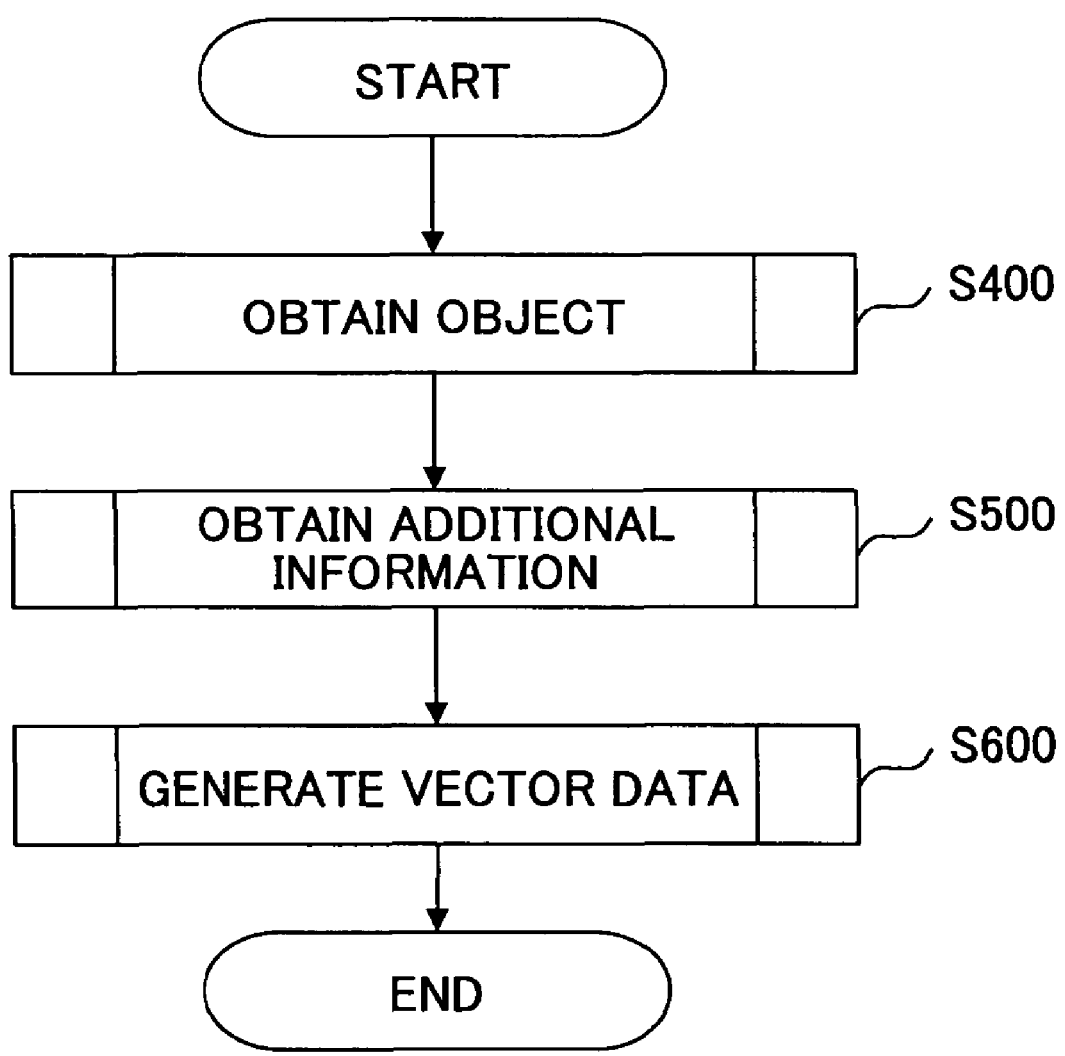
FIG. 11 is a flowchart showing a flow of a process for extracting the additional information from the image information where the additional information is added so that the vector data are generated.

More specifically, FIG. 11 is a view for explaining the entire process.

Referring to FIG. 11, in step S400, the object and the region of the object are obtained from the input image information. In step S500, the additional information added to the image information is extracted. In step S600, the image information is composed of vector data based on the additional information extracted in step S500.

(Flow of Process for Obtaining the Region of the Object)

Figure 12:
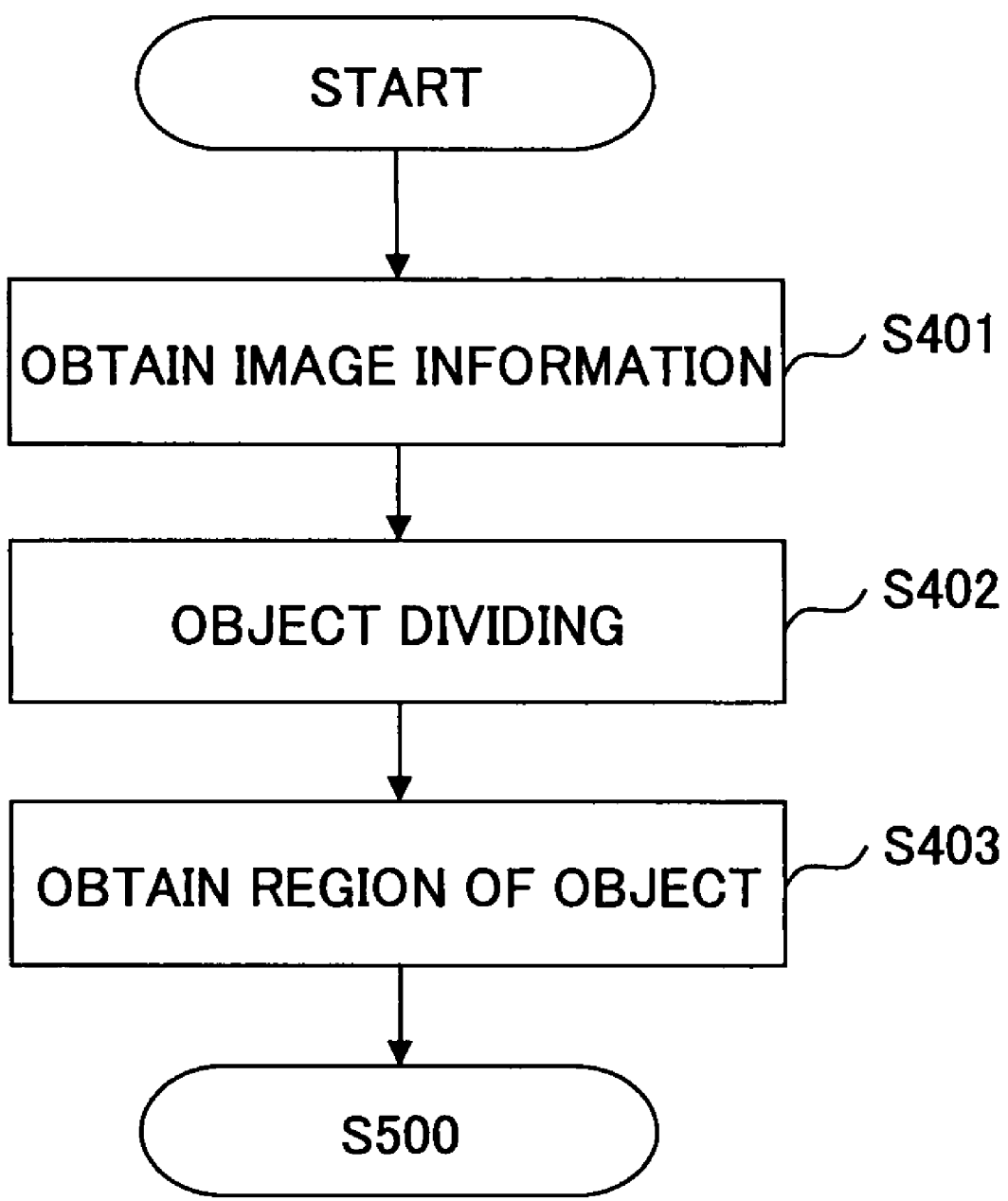
FIG. 12 is a flowchart showing a flow of a process for obtaining a region of the object from the image information.

FIG. 12 is a flowchart showing a flow of a process for obtaining a region of the object from the image information being input to the information processing apparatus 200.

In step S401, the image input part 201 obtains the image information where the additional information is added.

In step S402, the object dividing part 203 divides the image information obtained in step S401 to be input to the object by a designated method. The dividing method of the object in step S402 may be the same as the dividing method of the object in step S102.

Because of this, in a case where the information processing apparatus 100 and the information processing apparatus 200 are combined as a single apparatus, it is possible to commonly have a part for implementing the process. In addition, the object processed by the information processing apparatus 100 can be the substantially same as the object processed by the information processing apparatus 200.

In step S403, the object region obtaining part 204 obtains the region information that is position information of the object obtained in step S402. The region information may be composed of coordinates on the image, for example.

(Flow of a Process for Obtaining Data of the Object)

Figure 13:
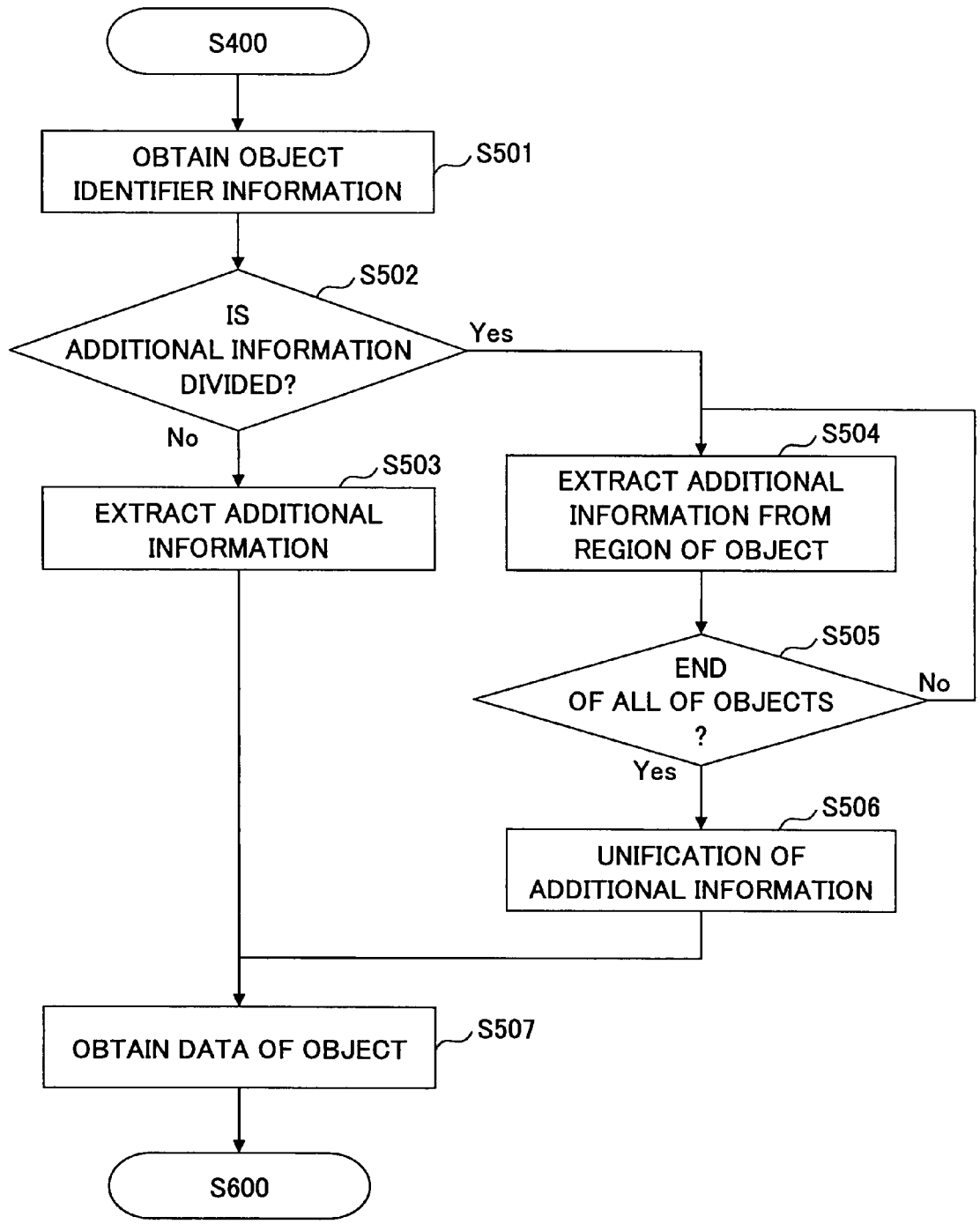
FIG. 13 is a flowchart showing a flow of a process for obtaining data of the object.

FIG. 13 is a flowchart showing a flow of a process for obtaining data of the object.

The data of the object are, for example, text data of the object of a character region or image data in the object of the image.

Referring to FIG. 13, in step S501, in a case where the object identifier information is added to the region of the object, the object identifier information extracting part 252 obtains the object identifier information from the region of the object obtained in step S403. In a case where the object identifier information is uniquely given to the object of the image information, it is possible to identify the object.

In step S502, whether the additional information added to the image information is divided for every region of the object and added is determined. In a case where additional information added to the image information is not divided for every region of the object, the process goes to step S503. In a case where additional information added to the image information is divided for every region of the object, the process goes to step S504.

Whether the additional information is divided and added is determined by the information processing apparatus 200 based on a method where adding and extracting are implemented in advance by a designated method or based on a method where the existence of dividing is added to the image information by a designated method.

In step S503, the additional information extracting part 210 extracts and obtains the additional information added to the image information. The additional information added to the image information is the object information or the arrangement information. The object information is extracted by the object information extracting part 211. The arrangement information is extracted by the arrangement information extracting part 212.

In step S504, the additional information extracting part 210 extracts the additional information from the region of the object obtained in step S403. The extracted additional information is the object information or the arrangement information. The object information is extracted by the object information extracting part 211 and the arrangement information is extracted by the object information extracting part 212.

In step S503 or step S504, the object information extracting part 211 and the arrangement information extracting part 212 may be combined as a single device.

In step S505, the additional information extracting part 210 determines whether extracting of the divided additional information is ended with respect to the regions of all of objects obtained in step S403. If it is ended, the process goes to step S506. If it is not ended, the process goes to step S504 again.

In step S506, the object information connection part 254 or the arrangement information connection part 256 connects the object information or the arrangement information that is the divided additional information obtained in step S504 so as to obtain the object information or the arrangement information.

The object information connection part 254 or the arrangement information connection part 256 may be combined as a single device with the object information extracting part 211 or the arrangement information extracting part 212.

In step S507, the object information obtaining part 220 obtains the data of the object based on the object information obtained in step S503 or the step S506.

The data of the object obtained by the object information obtaining part 220 is data of the object having the identifier information or the region of the coordinates referred to by the image reference information in a case where the object information includes the image reference information. The data of the object obtained by the object information obtaining part 220 is the main body of the data in a case where the object information has the main body of the data of the object.

(Flow of Process for Composing the Image Information as the Vector Data)

Figure 14:
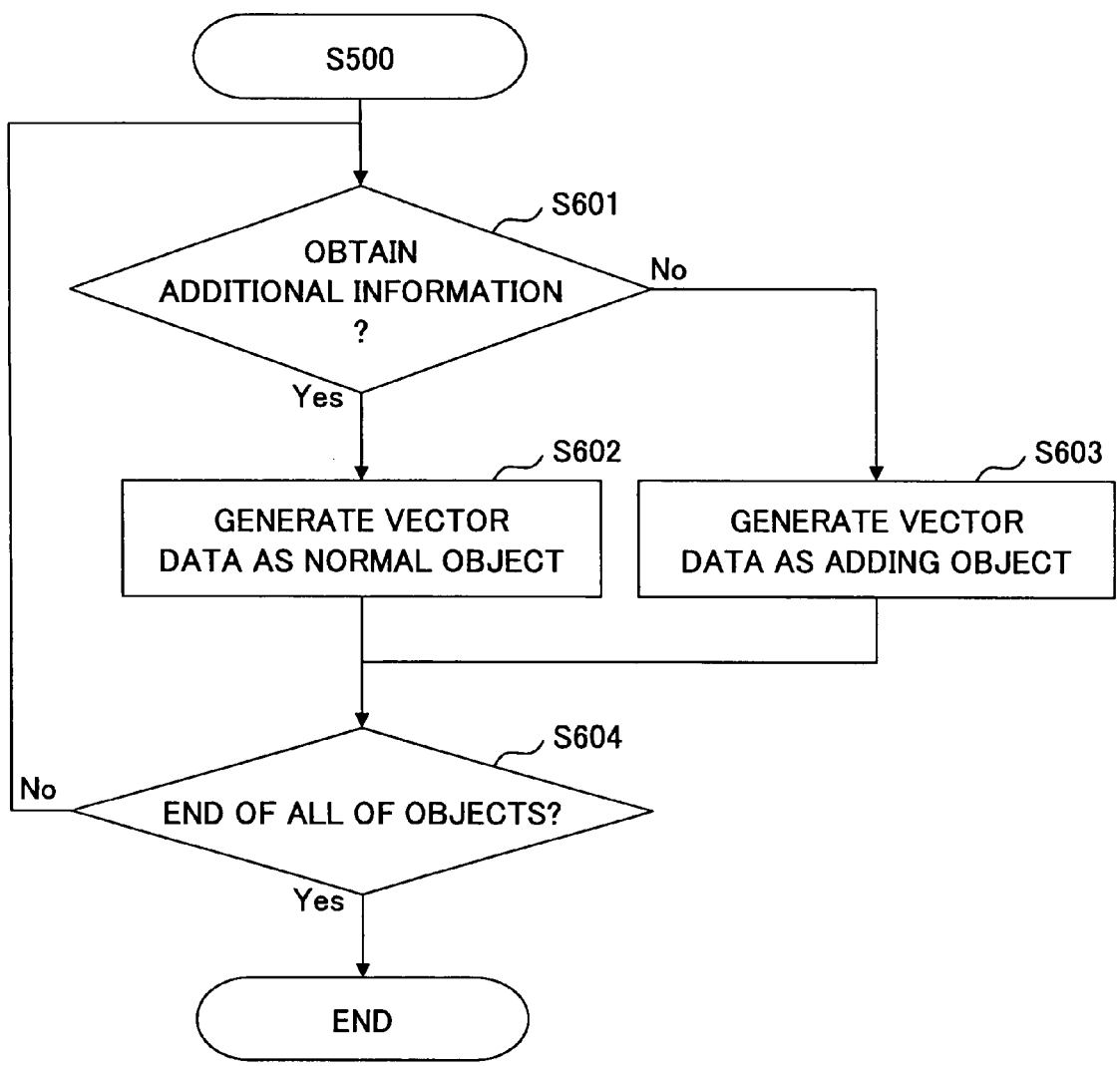
FIG. 14 is a flowchart showing a flow of a process composing the image information as vector data.

FIG. 14 is a flowchart showing a flow of a process composing the image information with vector data. In this flow, based on the additional information corresponding to the object, each of the objects is generated as the vector data.

In step S601, the vector data structure part 205 determines whether the additional information of each of the objects obtained in step S402 is obtained. If it is obtained, the process goes to step S602. If it is not obtained, the process goes to step S603.

In step S602, the vector data structure part 205 composes the object where the additional information is obtained with the vector data, based on the obtained object information or the arrangement information.

On the other hand, in step S603, the vector data structure part 205 generates the vector data to be input to the object where the additional information is not obtained, by a designated method set in advance. Here, the designated method is a method wherein a color of the object is reversed, a method wherein the object is arranged in a specific layer or in a designated position in an image, a method for processing for enhanced indication, or another method for distinguishing the object processed in step S602.

As a result of this, the object not extracted although the additional information is added or the object added after the additional information is added can be distinguished from other objects.

In step S604, the vector data structure part 205 determines whether the process for generating the vector data is ended for all of the objects obtained in step S402. If the process for generating the vector data is ended for all of the objects obtained in step S402, the process goes to "END". If the process for generating the vector data is not ended for all of the objects obtained in step S402, the process goes to step S601 again.

(Example where the Information Processing Apparatus 100 is a Computer)

Figure 15:
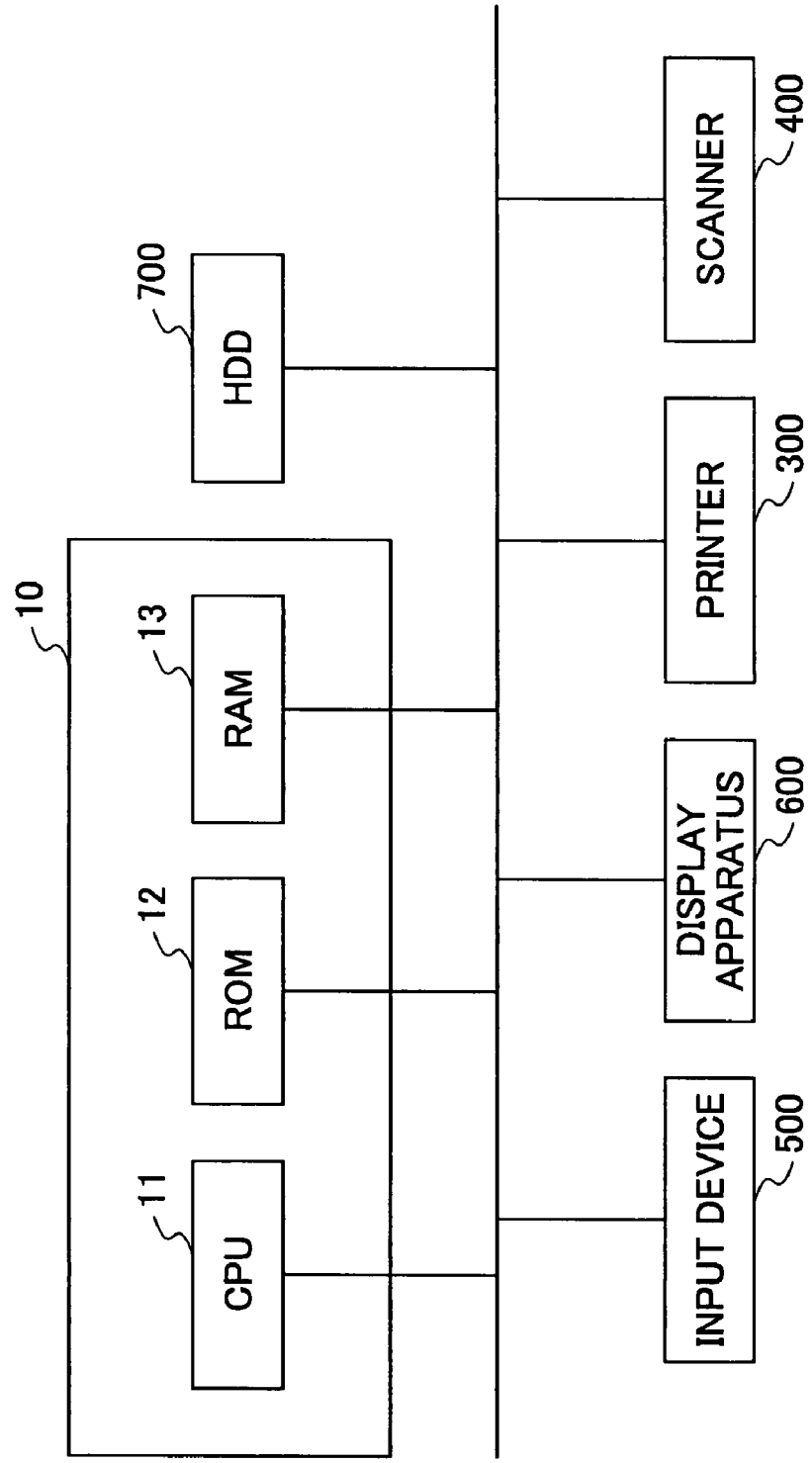
FIG. 15 is a block diagram showing a structural example of a computer implementing the information processing method of the embodiment of the present invention.

FIG. 15 is a block diagram showing a structural example of a computer implementing the information processing method of the embodiment of the present invention.

A main process part 10 of a computer is connected to a device or the like via a bus so as to implement the information processing method of the embodiment of the present invention.

As shown in FIG. 15, the main process part 10 of the computer is connected to a printer 300, a scanner 400, an input device 500, a display apparatus 600, and a hard disk drive 700 via a bus. The main process part 10 of the computer may be connected to the devices via a network.

The main process part of the computer includes a CPU 11, a ROM 12, and a RAM 13. The CPU 11 reads and implements a program stored in a storage part such as the ROM 12 so as to implement the information processing method of the embodiment of the present invention.

The ROM 12 is a storage part configured to store a program or the like implemented by the CPU 11. The RAM 13 is a storage part configured to store data for a while when the CPU 11 implements a process.

The printer 300 forms and outputs data of the document or the image on a medium such as a paper as an image by order of the main process part 10 of the computer. The scanner 400 reads the image formed on the medium such as a paper and generates raster data.

The input device 500 inputs the order to the main process part 10 of the computer. The display apparatus displays a process implemented by the main process part 10 of the computer. The hard disk drive 700 stores a large amount of data.

The information process program of the embodiment of the present invention may be stored in the hard disk drive 700, the ROM 12, or another storage medium that can be read by the main process part 10 of the computer.

(Example where the Information Processing Apparatus 20 is a Computer)

Figure 16:
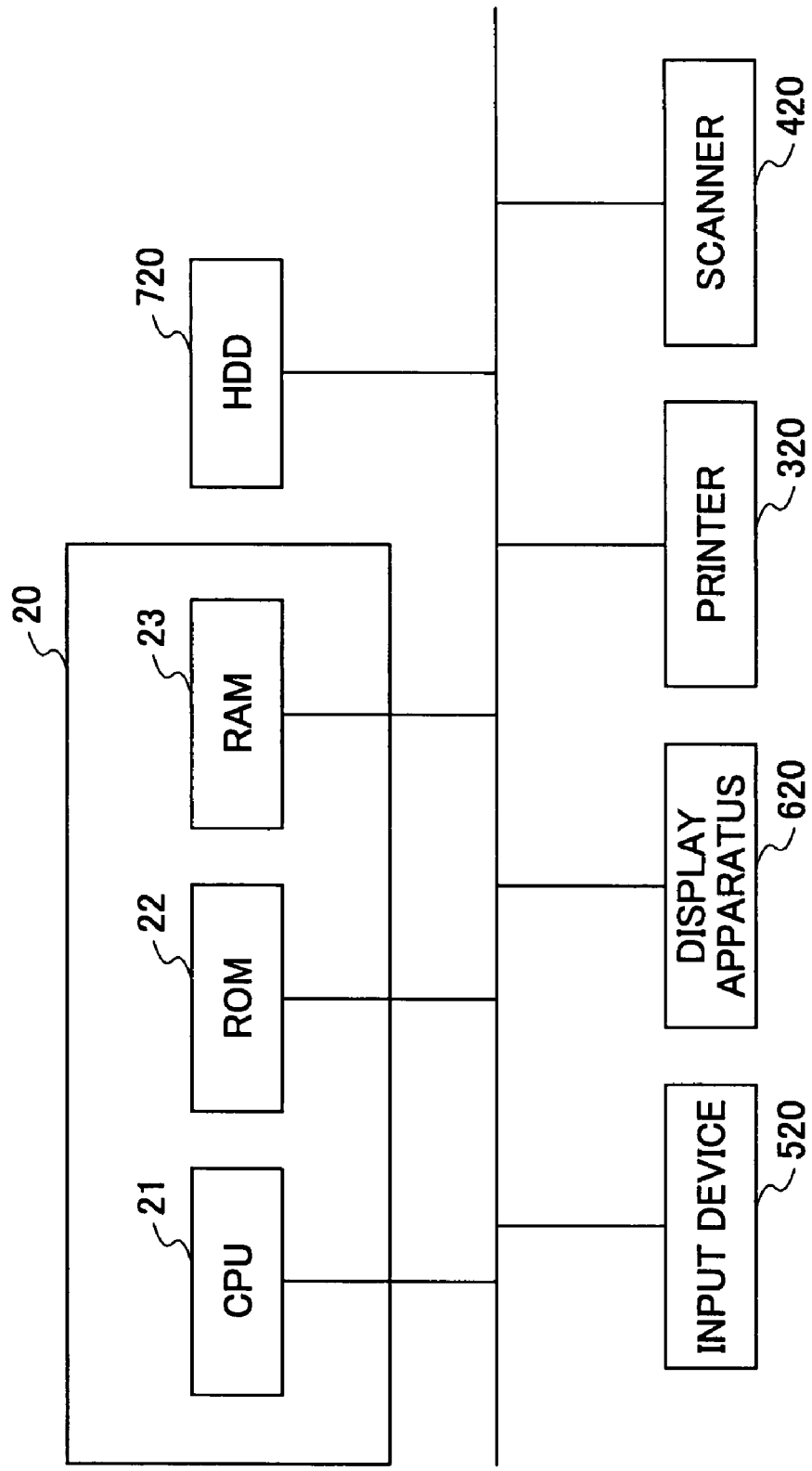
FIG. 16 is a block diagram showing an example where the information processing apparatus is a computer.

FIG. 16 is a block diagram showing an example where the information processing apparatus is a computer.

A main process part 20 of a computer is connected to a device or the like via a bus so as to implement the information processing method of the embodiment of the present invention.

As shown in FIG. 16, the main process part 20 of the computer is connected to a printer 320, a scanner 420, an input device 520, a display apparatus 620, and a hard disk drive 720 via a bus. The main process part 20 of the computer may be connected to the devices via a network.

The main process part 20 of the computer includes a CPU 21, a ROM 22, and a RAM 23. The CPU 21 reads and implements a program stored in a storage part such as the ROM 22 so as to extract the additional information from the image information where the additional information is added by the information processing method of the embodiment of the present invention and implements a process for composing the image information as vector data.

The ROM 22 is a storage part configured to store a program or the like implemented by the CPU 21. The RAM 23 is a storage part configured to store data for a while when the CPU 21 implements a process.

The printer 320, the scanner 420, the input device 520, the display apparatus 620, and the hard disk drive 720 implement the same operations for the main process part 20 of the computer as the operations implemented by the printer 300, the scanner 400, the input device 500, the display apparatus 600, and the hard disk drive 700, respectively. Therefore, details are omitted here.

The information process program realizing a process for extracting the additional information from the image information where the additional information is added by the information processing method of the embodiment of the present invention and for composing the image information as vector data may be stored in the had disk drive 720, the ROM 22, or another storage medium that can be read by the main process part 20 of the computer.

According to the above-discussed embodiments of the present invention, it is possible to provide an information processing apparatus configured to generate object information from image information, the information processing apparatus including: an image reference information generation part configured to generate image reference information based on the image information; wherein the object information includes the image reference information.

Thus, it is possible to provide an information processing apparatus whereby the information of the object of the image information can be generated with a small amount of data.

The image reference information may include information with respect to a coordinate of an object.

Thus, it is possible to provide an information processing apparatus whereby the image data of the object can be expressed by the coordinates of the image.

The information processing apparatus may further include: an arrangement information generation part configured to generate arrangement information for arranging the object, wherein the arrangement information includes information with respect to a size, an enlargement ratio, a reduction ratio, or a font of the object.

Thus, it is possible to provide an information processing apparatus whereby the arrangement information for arranging the object can be generated.

The information processing apparatus may further include an object identifier information giving part configure to give object identifier information for correlating the object information and the arrangement information to each other.

Thus, it is possible to provide an information processing apparatus whereby the object information and the arrangement information are correlated to each other by the object identifier information.

According to the above-discussed embodiments of the present invention, it is also possible to provide an information processing apparatus configured to add additional information with respect to an object to image information, the information processing apparatus including: an image reference information generation part configured to generate image reference information based on the image information; an object information generation part configured to generate object information having the image reference information generated by the image reference information generation part; and an information adding part configured to add the object information generated by the object information generation part to the image information as additional information.

Thus, it is possible to provide an information processing apparatus whereby the information of the object of the image information can be generated with a small amount of data and is added to the image information as the additional information.

The image reference information may include information with respect to a coordinate of an object.

Thus, it is possible to provide an information processing apparatus whereby the image data of the object can be expressed by the coordinates of the image.

The information processing apparatus may further include: an object identifier information giving part configured to give object identifier information to the object; and an object region obtaining part configured to obtain an object region that is a region of the object, from the image information; wherein the information adding part adds the object identifier information corresponding to the object to the object region obtained by the object region obtaining part.

Thus, it is possible to provide an information processing apparatus whereby the object identifier information is added to the region of the object.

The image reference information may include the object identifier information.

Thus, it is possible to provide an information processing apparatus whereby the image of the object can be expressed by the identifier information of the object.

The information processing apparatus may further include: an additional information dividing part configured to divide the additional information; wherein the information adding part adds the additional information divided by the additional information dividing part to the object region.

Thus, it is possible to provide an information processing apparatus whereby the additional information is divided and added for every object region.

The information processing apparatus may further include an arrangement information generation part configured to generate arrangement information for arranging the object, wherein the arrangement information includes information with respect to a size, an enlargement ratio, a reduction ratio, or a font of the object; and the additional information includes the arrangement information.

Thus, it is possible to provide an information processing apparatus whereby the arrangement information for arranging the object is generated and added to the image information.

According to the above-discussed embodiments of the present invention, it is also possible to provide an information processing method for generating object information from image information, the information processing method including an image reference information generation step of generating image reference information based on the image information, wherein the object information includes the image reference information.

The image reference information may include information with respect to coordinates of an object.

The information processing method may further include an arrangement information generation step of generating arrangement information for arranging the object, wherein the arrangement information may include information with respect to a size, an enlargement ratio, a reduction ratio, or a font of the object.

The information processing method further includes an object identifier information giving step of giving object identifier information for correlating the object information and the arrangement information to each other.

According to the above-discussed embodiments of the present invention, it is also possible to provide an information processing method whereby additional information with respect to an object is added to image information, the information processing method including: an image reference information generation step of generating image reference information based on the image information; an object information generation step of generating object information having the image reference information generated by the image reference information generation step; and an information adding step of adding the object information generated by the object information generation step to the image information as additional information.

The image reference information may include information with respect to a coordinate of the object. The information processing method may further include an object identifier information giving step of giving object identifier information to the object; and an object region obtaining step of obtaining an object region that is a region of the object, from the image information; wherein, in the information adding step, the object identifier information corresponding to the object is added to the object region obtained by the object region obtaining step. The image reference information may include the object identifier information. The information processing method may further include: an additional information dividing step of dividing the additional information; wherein, in the information adding step, the additional information divided by the additional information dividing step is added to the object region. The information processing method may further include: an arrangement information generation step of generating arrangement information for arranging the object, wherein the arrangement information includes information with respect to a size, an enlargement ratio, a reduction ratio, or a font of the object; and the additional information includes the arrangement information.

According to the above-discussed embodiments of the present invention, it is also possible to provide an information storing medium, which information storing medium can be read by a computer where an information processing program for making the computer implement an information processing method is stored, the information processing method including: an image reference information generation step of generating image reference information based on the image information; an object information generation step of generating object information having the image reference information generated by the image reference information generation step; and an information adding step of adding the object information generated by the object information generation step to the image information as additional information.

The image reference information may include information with respect to a coordinate of the object. The information processing method further include: an object identifier information giving step of giving object identifier information to the object; and an object region obtaining step of obtaining an object region that is a region of the object, from the image information; wherein, in the information adding step, the object identifier information corresponding to the object is added to the object region obtained by the object region obtaining step. The image reference information may include the object identifier information.

The present invention is not limited to these embodiments, but variations and modifications may be made without departing from the scope of the present invention.

This patent application is based on Japanese Priority Patent Application No. 2006-128556 filed on May 2, 2006, the entire contents of which are hereby incorporated by reference.

What is claimed is:

1. An information processing apparatus configured to generate object information from image information, the information processing apparatus comprising:
   an image input part configured to obtain image information; and
   a main process part including a CPU and a storage part connected to the image input part via a bus, the storage part storing a program for causing the CPU to have functions,
   wherein the CPU includes functional parts performing the functions when the CPU reads the program stored in the storage part, including:
      an object dividing part configured to extract an object from the image information;
      an image reference information generation part configured to generate object information using image reference information if the object is composed of an image whose data amount is greater than a predetermined amount, the image reference information having a small amount of data compared to the data amount of the image; and
      an object data obtaining part configured to obtain text data of the object and to generate object information having the text data if the object is composed of characters whose data amount is smaller than the predetermined amount.

2. The information processing apparatus as claimed in claim 1,
   wherein the image reference information includes information with respect to a coordinate of an object.

3. The information processing apparatus as claimed in claim 1, further comprising:
   an arrangement information generation part configured to generate arrangement information for arranging the object,
   wherein the arrangement information includes information with respect to a size, an enlargement ratio, a reduction ratio, or a font of the object.

4. The information processing apparatus as claimed in claim 3, further comprising:
   an object identifier information giving part configure to give object identifier information for correlating the object information and the arrangement information to each other.

5. An information processing apparatus configured to add additional information with respect to an object to image information, the information processing apparatus comprising:
   an image input part configured to obtain image information; and
   a main process part including a CPU and a storage part connected to the image input part via a bus, the storage part storing a program for causing the CPU to have functions,
   wherein the CPU includes functional parts performing the functions when the CPU reads the program stored in the storage including:
      an object dividing part configured to extract an object from the image information;
      an image reference information generation part configured to generate object information using image reference information if the object is composed of an image whose data amount is greater than a predetermined amount, the image reference information having a small amount of data compared to the data amount of the image; and
      an information adding part configured to add the object information generated by the image information generation part and the object data obtaining part to the image information as additional information.

6. The information processing apparatus as claimed in claim 5,
   wherein the image reference information includes information with respect to a coordinate of an object.

7. The information processing apparatus as claimed in claim 5, further comprising:
   an object identifier information giving part configured to give object identifier information to the object; and
   an object region obtaining part configured to obtain an object region that is a region of the object, from the image information;
   wherein the information adding part adds the object identifier information corresponding to the object to the object region obtained by the object region obtaining part.

8. The information processing apparatus as claimed in claim 7,
   wherein the image reference information includes the object identifier information.

9. The information processing apparatus as claimed in claim 7, further comprising:
   an additional information dividing part configured to divide additional information, the additional information including the object information and arrangement information for arranging the object;
   wherein the information adding part adds the additional information divided by the additional information dividing part to the object region.

10. The information processing apparatus as claimed in claim 5, further comprising:
    an arrangement information generation part configured to generate arrangement information for arranging the object,
    wherein the arrangement information includes information with respect to a size, an enlargement ratio, a reduction ratio, or a font of the object; and
    the additional information includes the arrangement information.

11. An information processing method whereby additional information with respect to an object is added to image information, the information processing method comprising:

an object dividing step of extracting an object from image information implemented by a computer;

an image reference information generation step of generating object information using image reference information if the object is composed of an image whose data amount is greater than a predetermined amount, the image reference information having a small amount of data compared to the data amount of the image, the image reference generation step being implemented by the computer;

an object data obtaining step of obtaining text data of the object and to generate object information having the text data if the object is composed of characters whose data amount is smaller than the predetermined amount, the object data obtaining step being implemented by the computer; and an information adding step of adding the object information generated by the object information generation step and the object data obtaining step to the image information as additional information implemented by the computer.

12. The information processing method as claimed in claim 11, wherein
the image reference information includes information with respect to a coordinate of the object.

13. The information processing method as claimed in claim 11, further comprising:
an object identifier information giving step of giving object identifier information to the object; and
an object region obtaining step of obtaining an object region that is a region of the object, from the image information;
wherein, in the information adding step, the object identifier information corresponding to the object is added to the object region obtained by the object region obtaining step.

14. The information processing method as claimed in claim 13,
wherein the image reference information includes the object identifier information.

15. The information processing method as claimed in claim 13, further comprising:
an additional information dividing step of dividing additional information, the additional information including the object information and arrangement information for arranging the object;
wherein, in the information adding step, the additional information divided by the additional information dividing step is added to the object region.

16. The information processing method as claimed in claim 11, further comprising:
an arrangement information generation step of generating arrangement information for arranging the object,
wherein the arrangement information includes information with respect to a size, an enlargement ratio, a reduction ratio, or a font of the object; and
the additional information includes the arrangement information.

17. A non-transitory computer readable medium storing a program causing a computer to implement a process, the process comprising:
an object dividing step of extracting an object from image information implemented by a computer;
an image reference information generation step of generating object information using image reference information if the object is composed of an image whose data amount is greater than a predetermined amount, the image reference information having a small amount of data compared to the data amount of the image;
an object data obtaining step of obtaining text data of the object and to generate object information having the text data if the object is composed of characters whose data amount is smaller than the predetermined amount; and
an information adding step of adding the object information generated by the object information generation step and the object data obtaining step to the image information as additional information.

18. The non-transitory computer readable medium as claimed in claim 17,
wherein the image reference information includes information with respect to a coordinate of the object.

19. The non-transitory computer readable medium as claimed in claim 17, wherein the information processing method further including:
an object identifier information giving step of giving object identifier information to the object; and
an object region obtaining step of obtaining an object region that is a region of the object, from the image information;
wherein, in the information adding step, the object identifier information corresponding to the object is added to the object region obtained by the object region obtaining step.

20. The non-transitory computer readable as claimed in claim 19,
wherein the image reference information includes the object identifier information.

* * * * *